(12) United States Patent
Baessler et al.

(10) Patent No.: US 12,088,718 B2
(45) Date of Patent: Sep. 10, 2024

(54) MASKING SENSITIVE INFORMATION IN A DOCUMENT

(71) Applicant: INTERNATIONAL BUSINESS MACHINES CORPORATION, Armonk, NY (US)

(72) Inventors: Michael Baessler, Bempflingen (DE); Albert Maier, Tuebingen (DE); Mike W. Grasselt, Leinfelden-Echterdingen (DE); Yannick Saillet, Stuttgart (DE); Lars Bremer, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 17/073,436

(22) Filed: Oct. 19, 2020

(65) Prior Publication Data
US 2022/0123935 A1 Apr. 21, 2022

(51) Int. Cl.
*G06F 16/93* (2019.01)
*G06F 16/35* (2019.01)
(Continued)

(52) U.S. Cl.
CPC .......... *H04L 9/3213* (2013.01); *G06F 16/355* (2019.01); *G06F 16/907* (2019.01); *G06F 16/93* (2019.01); *G06F 40/284* (2020.01)

(58) Field of Classification Search
CPC .............................. G06F 16/93; G06F 16/355
(Continued)

(56) References Cited

U.S. PATENT DOCUMENTS

| 7,908,279 B1 * | 3/2011 | Thirumalai ........... G06F 40/194 |
| | | 707/750 |
| 8,179,556 B2 | 5/2012 | Salgado |

(Continued)

FOREIGN PATENT DOCUMENTS

| CN | 114386085 A | 4/2022 |
| DE | 102021123058 A1 | 4/2022 |

(Continued)

OTHER PUBLICATIONS

United Kingdom Intellectual Property Office, Combined Search and Examination Report dated Mar. 9, 2022, 8 pgs., GB Application No. GB2113984.5.

(Continued)

*Primary Examiner* — Hosain T Alam
*Assistant Examiner* — Tracy M McGhee
(74) *Attorney, Agent, or Firm* — Caleb D. Wilkes

(57) ABSTRACT

The exemplary embodiments disclose a method, a computer program product, and a computer system for protecting sensitive information. The exemplary embodiments may include using an inverted text index for evaluating one or more statistical measures of an index token of the inverted text index, using the one or more statistical measures for selecting a set of candidate tokens, extracting metadata from the inverted text index, associating the set of candidate tokens with respective token metadata, tokenizing at least one document resulting in one or more document tokens, comparing the one or more document tokens with the set of candidate tokens, selecting a set of document tokens to be masked, selecting at least part of the set of document tokens that comprises sensitive information according to the associated token metadata, masking the at least part of the set of document tokens, and providing one or more masked documents.

20 Claims, 8 Drawing Sheets

(51) Int. Cl.
  *G06F 16/907*   (2019.01)
  *G06F 40/284*   (2020.01)
  *H04L 9/32*     (2006.01)

(58) Field of Classification Search
  USPC ........................................................ 707/737
  See application file for complete search history.

(56) References Cited

U.S. PATENT DOCUMENTS

| | | | |
|---|---|---|---|
| 2008/0239365 A1* | 10/2008 | Salgado | G06F 3/1284 |
| | | | 358/1.15 |
| 2014/0188921 A1 | 7/2014 | Thomason | |
| 2016/0241546 A1* | 8/2016 | Arnady | H04L 63/061 |
| 2018/0218164 A1* | 8/2018 | Cachin | G06F 21/602 |
| 2019/0018977 A1 | 1/2019 | Ohtake | |

FOREIGN PATENT DOCUMENTS

| | | |
|---|---|---|
| EP | 3173965 A1 | 5/2017 |
| GB | 2600823 A | 5/2022 |
| JP | 2022067087 A | 5/2022 |
| WO | 2020074651 A1 | 4/2020 |

OTHER PUBLICATIONS

Mell et al., "The NIST Definition of Cloud Computing", National Institute of Standards and Technology, Special Publication 800-145, Sep. 2011, pp. 1-7.

Sanchez et al., "Detecting sensitive information from textualdocuments: an information-theoretic approach", Springer-Verlag, Berlin Heidelberg, 2012 pp. 173-184.

IBM, "Response to United Kingdom Intellectual Property Office Examination Report dated Mar. 9, 2022," UK Patent Application No. 2113984.5, May 16, 2022, 4 pgs.

Chinese Notification of the First Office Action, Chinese Application No. 202111208569.3, Dated Jun. 24, 2024, 17 pages (pp. 1-7 English Translation, pp. 8-17 Original Office Action).

* cited by examiner

MASKING SENSITIVE INFORMATION IN A DOCUMENT

BACKGROUND

The present invention relates to the field of digital computer systems, and more specifically, to a method for masking sensitive information in a document.

Data protection and keeping sensitive information private is very important for companies and their customers. However, technical challenges of data privacy protection are growing with a trend of moving services to third parties and into the cloud with increased diversity of data.

SUMMARY

The exemplary embodiments disclose a method, a computer program product, and a computer system for protecting sensitive information. The exemplary embodiments may include using an inverted text index for evaluating one or more statistical measures of an index token of the inverted text index, using the one or more statistical measures for selecting a set of candidate tokens, extracting metadata from the inverted text index, associating the set of candidate tokens with respective token metadata, tokenizing at least one document resulting in one or more document tokens, comparing the one or more document tokens with the set of candidate tokens, selecting a set of document tokens to be masked, selecting at least part of the set of document tokens that comprises sensitive information according to the associated token metadata, masking the at least part of the set of document tokens, and providing one or more masked documents.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
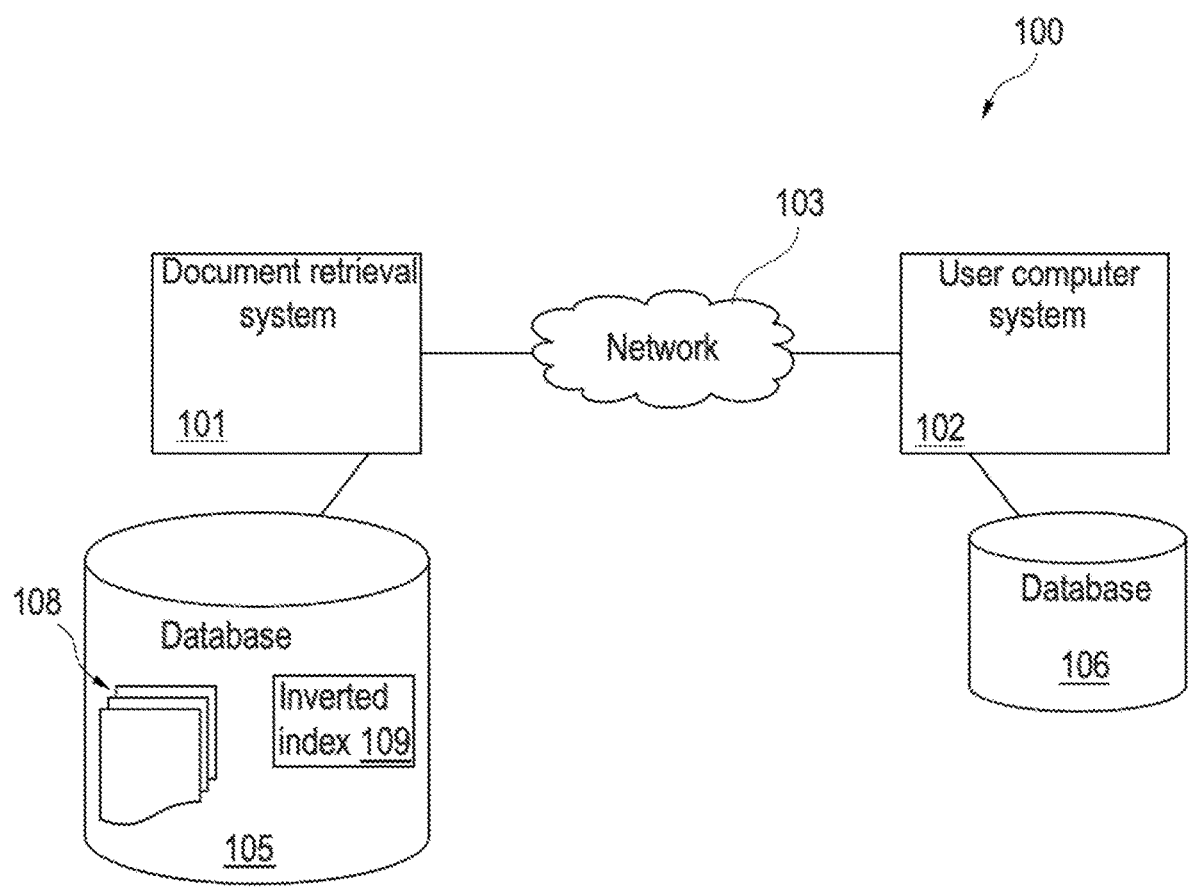
FIG. 1 depicts an exemplary block diagram of a system, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The requested document may be a structured or unstructured document. By contrast to a structured document, the unstructured document may comprise unstructured information that either does not have a predefined data model or is not organized in a predefined manner. This may make difficult an understanding of such documents using programs as compared to data stored in fielded form in databases or annotated in documents of structured documents. The document may, for example, be an electronic document. The electronic document may be an electronic media content that is intended to be used in either an electronic form or as printed output. The electronic document may comprise, for example, a web page, a document embedded in a web page and that may be rendered in the web page, spreadsheet, email, book, picture, and presentation that have an associated user agent such as a document reader, editor or media player.

A typical application scenario for documents may include loading a document and displaying it on interfaces to different users. However, this may result in data which includes sensitive information being copied to a less-trusted environment. The sensitive information may comprise private data such as social-security numbers, passport data, credit card numbers, health-record details, etc. which should not be leaked to untrusted parties. The present subject matter may solve this issue by using data masking. The purpose of data masking may be to de-sensitize the data, so as to hide or mask sensitive data items, such that the data as a whole remains useful for its intended purpose. The data masking may be performed so that the access to the document fulfils predefined data access rules. The data access rules may comprise governance policies and/or user access rights. For example, the governance rules may require protecting any kind of sensitive information such as personal information.

However, conventional data masking may be very resource consuming as it may require large infrastructure processing, settings and configurations to work. The present subject matter may solve this issue by providing efficient and optimized data masking of documents. The present subject matter may be efficient in that it may use the same set of candidate tokens potentially containing sensitive information to identify the content to be masked in multiple requested documents. This may save processing resources that would otherwise be required to process every document individually. The present subject matter may be optimal in that the inverted text index (also referred to as inverted index) may be provided in different format e.g. compressed format, that enables a resource saving processing. The inverted text index may be an index data structure storing a mapping from tokens, such as words or numbers, to its locations in a document or multiple documents of the set of documents. For example, the inverted text index may be a hashmap data structure. The tokens of the inverted text index may be referred to as the index tokens.

According to one embodiment, the method further comprises: determining topic metadata of the set of candidate tokens. The topic metadata of each token of the set of candidate tokens indicates a topic of the token or a topic of a document containing the token, wherein the token metadata of the token further comprises the topic metadata.

The topic metadata of a token may comprise an attribute value representing the topic of the token and one or more values of attributes descriptive of the topic of the token. For example, if the token is morbus-addison which is an orphan disease, the topic for that token may be disease and some topic metadata may be indicators like orphan disease. It may also be possible that a token is associated with multiple topics. Following the above example, the topics of the token morbus-addison may be disease topic and the orphan disease topic. The topic metadata of the token may in addition or alternatively comprise a governance rule that indicates values of the tokens of this topic that need to be confidential. For example, the topic of a given token may relate to a healthcare system and the governance rule may indicate that information about patients should be treated confidentially. The content of the token metadata of each candidate token may thus be processed to determine if it contains sensitive information e.g. using data sensitive-non sensitive classifier. The classifier may, for example, use the domain of the token to associate it with the governance catalog and the rules defined for the domain may be used to classify the token. This processing may, for example, further comprise data mining to interpret and apply rules on attribute values present in the token metadata. The data mining may enable to check again the metadata with a business glossary to see what is "known" about metadata and if any kind of sensitivity classification is associated with it.

This embodiment may enable an accurate selection of the at least part of the set of candidate tokens as the selection may be based on a rich content of the metadata.

According to one embodiment, the method further comprises inputting the token topic to an information governance tool and receiving as output the topic metadata. The information governance tool may, for example, be a company governance catalog solution.

According to one embodiment, the statistical measure of the index token comprises one or a combination of: number of documents of the set of documents containing the index token, the frequency of occurrence of the index token in the set of documents, the frequency of occurrence of a token type of the index token in the set of documents, wherein selecting the set of candidate tokens comprises comparing the statistical measure with a predefined threshold. The token type may be a text type, number type, or a combination thereof. For example, a configurable threshold may be provided for each token type indicating how often a token is allowed to occur in the set of documents (posting list of tokens). For example, in case the frequency of occurrence of an index token is smaller than the configurable threshold, it may be selected as a candidate token that may potentially contain sensitive information. That is, the less frequent an index token is the more likely it is that this is individual information that is suspicious and potentially have to be masked. In another example, more than one statistical measure may be used to decide whether an index token is a candidate token that potentially contains sensitive information. Following the above example, if the frequency of occurrence of an index token is less than the configurable threshold, it may further be determined whether the number of documents of the set of documents containing said index token is smaller than another configurable threshold, and if yes, the index token may be selected as a candidate token.

According to one embodiment, the inverted text index is updated in case the set of documents changes. The method further comprises: storing the set of candidate tokens in association with the token metadata in a storage system or data store, and repeatedly: performing the selection of set of candidate tokens and the extraction of the metadata, and updating the storage system accordingly, wherein the updated storage system is used for selecting the document tokens that are masked.

The present method may comprise a first method for providing the set of candidate tokens followed by a second method for masking a requested document. The first method comprises the steps of the present method executed before receiving the request of the document. And the second method comprises the step of receiving the request of the document and following steps of the present method. The second method may be performed independently of the first method. For example, upon receiving a request of a document, the storage system may be read to retrieve the set of candidate tokens. The storage system may be updated using the first method with new set of candidate tokens independently of the second method. Thus, this embodiment may further improve the accuracy of the data masking as it may be based on up to date data.

According to one embodiment, selecting the at least part of the set of document tokens that comprises sensitive information according to the associated token metadata comprises running a classifier on the token metadata, and classifying the set of document tokens as sensitive or not sensitive tokens, wherein the selection is performed based on the classification. For example, if the token metadata comprise the token type, it may be used to decide whether a document token is to be masked or not. If the document token is a combination of numbers and strings, this may indicate that it represents sensitive information. That is, only candidate tokens of a specific category or type may be masked. The frequency of occurrence of a token may be defined (first definition) as the number of occurrences of the token divided by the number of documents of the set of documents. In another example, the frequency of occurrence may be defined (second definition) as the number of documents containing the token divided by the number of documents in the set of documents. If, for example, the token metadata further comprises the document IDs of the documents in which the index token is present, the document IDs may advantageously be used to mask or not mask the document token if the frequency of occurrence, according to the first definition, of the document tokens is low i.e. smaller than a threshold. For example, since the frequency is defined with respect to all documents, the frequency may still be small even if the same token is present in only one document because the frequency is computed using all documents. That is, if the same document token is present in only one document, ten times it may indicate that it is not sensitive although the frequency may be small. Thus, using the additional document IDs may enable to detect such cases e.g. as being non sensitive. If, for example, the token metadata further comprises a governance rule indicating that the users located in a certain region are not allowed to access information such as addresses of persons, then the classifier may determine the location of the user who requested the document and may decide whether to mask the address information (which is part of the set of document tokens) based on that location and in accordance with the rule.

According to one embodiment, the method further comprises: determining a domain represented by a content of the requested document, wherein the set of documents represent the determined domain and exclude the requested document. In other words, the requested document may have not been used to generate the inverted index; however, the inverted index may advantageously be used according to this embodiment as it requires that the requested document and the set of documents of the inverted index have the same domain. This may enable, for example, to separate test data used to provide the candidate tokens from data used to classify tokens to be masked.

According to one embodiment, the set of documents comprise the requested document. This may be advantageous as it may provide accurate selection of set of document tokens and thus accurate data masking because the document tokens may be part of the index tokens.

FIG. 1 is a block diagram illustrating a document provider system 100 in accordance with an example of the present subject matter. The document provider system 100 comprises a document retrieval system 101 and a user computer system 102. The document retrieval system 101 and the user computer system 102 may be operable for communication via a network 103. The network 103 may, for example, be the Internet, a local area network, a wide area network and/or a wireless network.

The document retrieval system 101 has access to documents in a storage, represented here by a database 105, operatively coupled to the document retrieval system 101. The database 105 contains documents to be sent to the user computer system 102 in operation. These documents may be any type of mainly unstructured text, such as newspaper articles, real estate records or paragraphs in a manual. The document retrieval system 101 may enable document retrieval. The document retrieval may be defined as a matching of some stated user query of the user computer system 102 against one or more documents in the database 105. The documents 108 stored in the database 105 may represent a set of one or more domains. For example, the documents 108 may comprise multiple sets of documents representing distinct domains respectively. A domain represents concepts or categories which belong to a part of the world, such as biology or politics. The domain typically models domain-specific definitions of terms. For example, a domain can refer to healthcare, advertising, commerce, medical and/or biomedical-specific field. The database 105 may further comprise an inverted text index 109. The inverted text index may be an index data structure storing a mapping from index tokens, such as words or numbers, to its locations in a document or multiple documents of the documents 108. For simplification of the description, only one inverted text index is shown but it is not limited to e.g. the database 105 may store one inverted index for each set of the multiple sets of documents.

The document retrieval system 101 may be configured to protect sensitive information in accordance with the present subject matter. For example, the document retrieval system 101 may implement a dynamic data masking process whereby documents may be accessed, masked and sent to the user computer system 102 as required. In particular, the document to be sent to the user computer system 102 may contain certain tokens which may be masked before the document is sent out. For example, the tokens to be masked may dynamically be determined based on the context in which the document is requested or is to be sent to the user computer system 102. For example, depending on the data access rules, the same document might be masked differently depending on the locations of the user computer system 102 and the user submitting the query to access the document. For example, European (EU) or United States (US) data may be masked according to General Data Protection Regulation (GDPR) or Federal Law.

The user computer system 102 may receive the masked document via the network 103 and stores the masked document in storage, represented here by database 106, operatively coupled to the user computer system 102.

Figure 2:
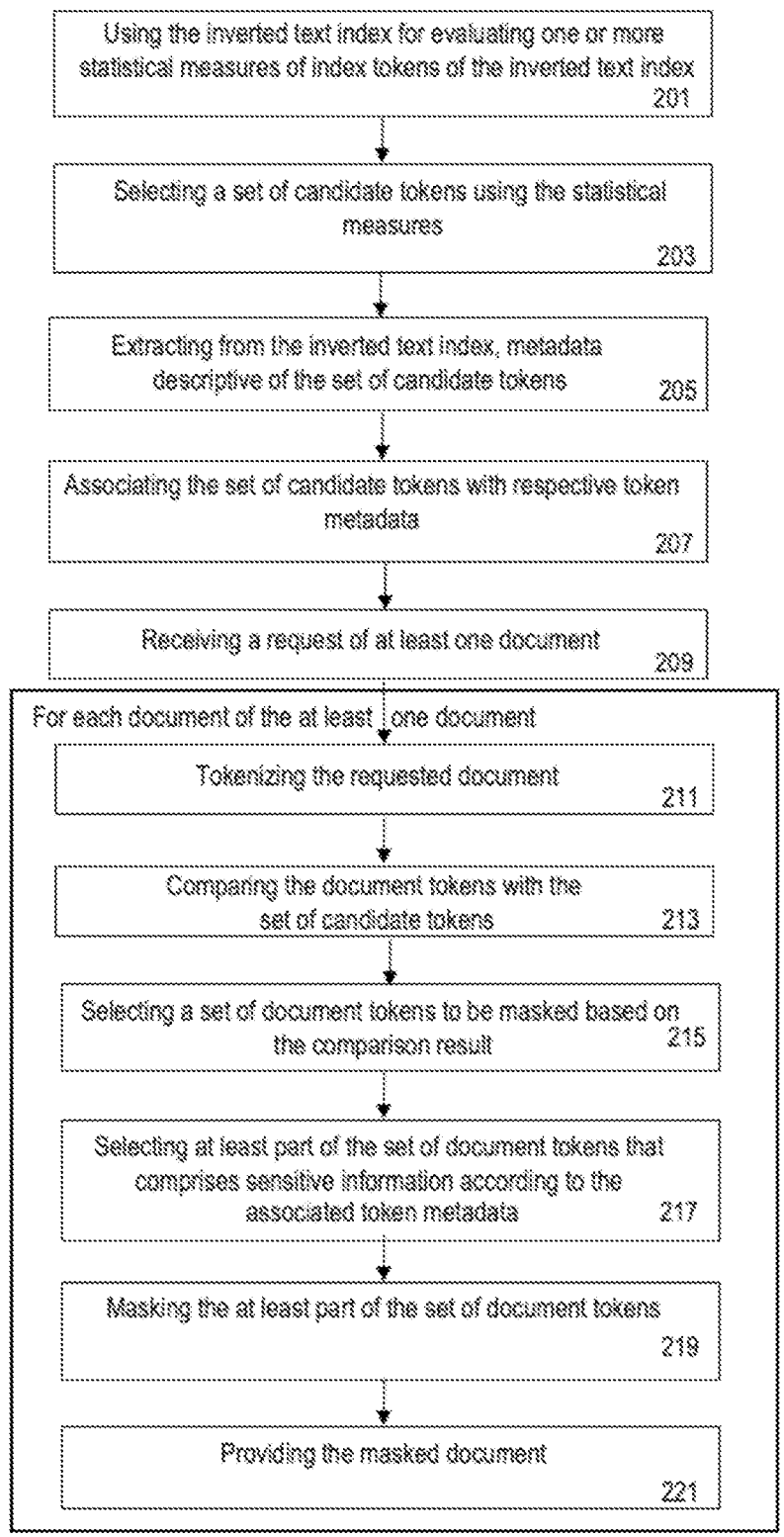
FIG. 2 depicts an exemplary flowchart illustrating a method for protecting sensitive information in documents, in accordance with the exemplary embodiments.

FIG. 2 is a flowchart of a method for protecting sensitive information in documents in accordance with an example of the present subject matter. For the purpose of explanation, the method described in FIG. 2 may be implemented in the system illustrated in FIG. 1 but is not limited to this implementation. The method of FIG. 2 may, for example, be performed by the document retrieval system 101.

The inverted text index 109 may be used in step 201 for evaluating one or more statistical measures of index tokens of the inverted text index 109. The statistical measure of the index token may comprise one or a combination of: number of documents of the set of documents 108 containing the index token, the frequency of occurrence of the index token in the set of documents and the frequency of occurrence of a token type of the index token in the set of documents. The statistical measures may be evaluated using information contained in the inverted text index 109. The combination of the number of documents and the frequency may, for example, be an array or vector or list etc. having two elements comprising said number of documents and frequency.

The evaluated statistical measures may be used for selecting in step 203 from the index tokens of the inverted text index 109 a set of candidate tokens that may contain sensitive information. For that, the statistical measure of each index token of the inverted text index 109 may be compared with a threshold. The threshold may be a configurable threshold. Based on the comparison result, each index token may be selected as candidate token. For example, if an index token is not frequently present in the set of documents 108, that index token may be selected as a candidate token. For that, the frequency of occurrence of the index token in the set of documents 108 may be compared with a maximum frequency value. If the frequency of cooccurrence is less than the maximum frequency value, the index token may be selected as a candidate token. This may result in a set of N candidate tokens $T_{cand1}, T_{cand2} \ldots T_{candN}$.

Metadata descriptive of the set of candidate tokens may be extracted in step 205 from the inverted text index 109. The extracted metadata of the index token may comprise at least a token type of the index token and a document identifier of a document containing the index token.

The set of candidate tokens may be associated in step 207 with respective token metadata, wherein the token metadata of the token comprises the extracted metadata of the token. The set of candidate tokens may, for example, be stored in a data store, in association with the token metadata e.g. the candidate tokens may be stored with some metadata around token type, document frequency, and potential other information like document metadata (e.g. type) that is present in the inverted text index, this also includes the document IDs of the documents this token was in.

A request of at least one document of the documents 108 may be received in step 209. The request may, for example, be a user query that may range from multi-sentence full descriptions of an information need to a few words. The request of the document may be received from the user computer system 102. The user computer system 102 may, for example, receive a data analysis request from a user of the user computer system 102. The data analysis request may comprise natural language data. A natural language processing of the data analysis request may be performed by the user computer system 102 resulting in the request that is sent by the user computer system 102. The term "user" refers to an entity e.g., an individual, another computer, or an application executing on the user computer system 102.

Upon receiving the request, the requested document may be tokenized in step 211 to obtain document tokens. This may result in a tokenized document which may be a document represented as a collection of words (document tokens). This step 211 may be optional if, for example, the inverted text index comprises index tokens of the requested document. In this case, those index tokens may be provided as the document tokens of the requested document e.g. without having to tokenize anew the requested document.

The document tokens of the requested document may be compared in step 213 with the set of candidate tokens. For that, the set of candidate tokens may be read from the data store. This may be advantageous as the data store may comprise the up to date version of the set of candidate tokens.

Based on the comparison result, a set of document tokens to be masked may be selected in step 215 from all the document tokens of the requested document. The comparison result may, for example, indicate which document tokens are part of the set of candidate tokens. Thus, the selected set of document tokens may comprise document tokens that belong to the set of candidate tokens. In addition, the comparison result may, for example, indicate the document tokens which are semantically related to the set of candidate tokens. Those semantically related document tokens may be part of the set of document tokens. For example, if the candidate token indicates the age of a patient (that should be confidential in certain contexts), a document token comprising the birth date may be semantically related to that candidate token. The information about semantic relations of a token may, for example, be part of the token metadata. This step 215 may result in a set of M document tokens $T_{doc1}, T_{doc2} \ldots T_{docM}$. Each of the M document tokens $T_{doc1}, T_{doc2} \ldots T_{docM}$ may be associated with one or more candidate tokens $T_{cand1}, T_{cand2} \ldots T_{candN}$. For example, two or more document tokens may be associated with different candidate tokens or with a same candidate token. Each document token of the set of M document tokens may be associated with the token metadata of the corresponding candidate token(s).

At least part of the set of document tokens that comprises sensitive information according to the associated token metadata may be selected in step 217. The at least part of the set of document tokens may comprise L document tokens $T_{doc1}, T_{doc2} \ldots T_{docL}$, where $L \leq M$. The selection may be performed by processing the token metadata associated with the set of document tokens. This step 217 may, for example, be automatically performed. For example, if the token is associated with a topic/term that can be also found or associated within the governance catalog with a business term, rules defined for this business term can be applied. E.g. if the business term is defined as sensitive, the candidate token may be masked.

The at least part of the set of document tokens may be masked in step 219 in the document, resulting in a masked document. For example, the masking may be performed via hashing. Here, a document token may be hashed together with a long-term hash key. The document token may then be replaced with the resulting hash value in the masked document sent to the user. Other known methods which are based on substitution, shuffling, deletion ("nulling"), obfuscation, or perturbation techniques may be used for performing the masking.

The masked document may be provided in step 221. For example, the document retrieval system 101 may send in response to the request the masked document to the user computer system 102.

Steps 211 to 221 may be repeated for each requested document in step 209. For example, the requested documents may be processed concurrently or in parallel by the steps 211 to 221.

Figure 3:
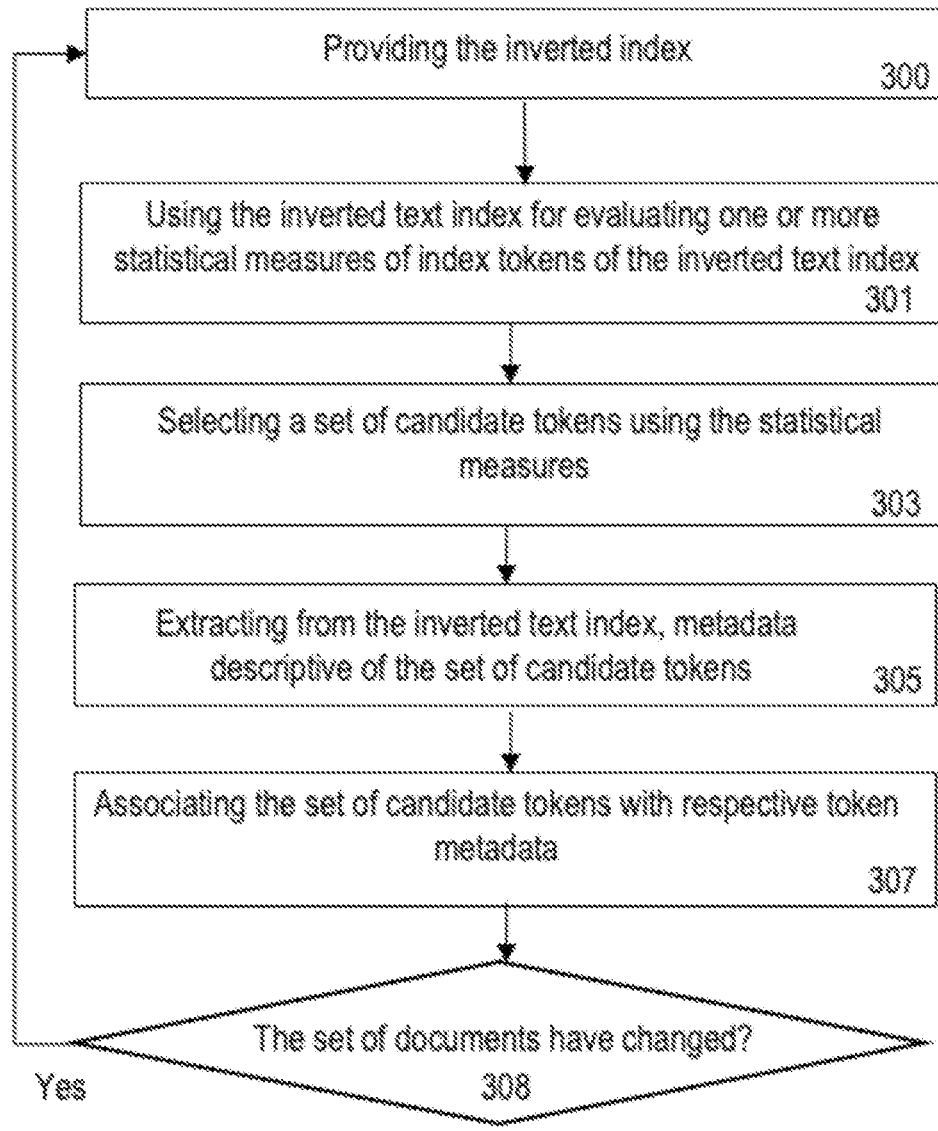
FIG. 3 depicts an exemplary flowchart illustrating a method for providing a set of candidate tokens which may comprise sensitive information, in accordance with the exemplary embodiments.

FIG. 3 is a flowchart of a method for providing a set of candidate tokens which may comprise sensitive information in accordance with an example of the present subject matter. For the purpose of explanation, the method described in FIG. 3 may be implemented in the system illustrated in FIG. 1 but is not limited to this implementation. The method of FIG. 3 may, for example, be performed by the document retrieval system 101.

In step 300, an inverted text index 109 may be provided. The inverted text index 109 is obtained from a set of documents e.g. the index tokens and associated information of the inverted text index are obtained from the set of documents.

The inverted text index 109 may be used in step 301 for evaluating one or more statistical measures of index tokens of the inverted text index 109. The statistical measure of the index token may comprise one or a combination of: number of documents of the set of documents 108 containing the index token, the frequency of occurrence of the index token in the set of documents and the frequency of occurrence of a token type of the index token in the set of documents. The statistical measures may be evaluated using information contained in the inverted text index 109.

The evaluated statistical measures may be used for selecting in step 303 from the index tokens of the inverted text index 109 a set of candidate tokens that may contain sensitive information. For that, the statistical measure of each index token of the inverted text index 109 may be compared with a threshold. The threshold may be a configurable threshold. Based on the comparison result, each index token may be selected as a candidate token. For example, if an index token is not frequently present in the set of documents 108, that index token may be selected as candidate token. For that, the frequency of occurrence of the index token in the set of documents 108 may be compared with a maximum frequency value. If the frequency of cooccurrence is less than that the maximum frequency value, the index token may be selected as a candidate token.

Metadata descriptive of the set of candidate tokens may be extracted in step 305 from the inverted text index 109. The extracted metadata of the index token may comprise at least a token type of the index token and a document identifier of a document containing the index token.

The set of candidate tokens may be associated in step 307 with respective token metadata, wherein the token metadata of the token comprises the extracted metadata of the token. The set of candidate tokens may be stored in a data store.

It may be determined (inquiry step 308) if the set of documents that are represented by the inverted index have changed. The change may, for example, comprise the addition of one or more documents to the set of documents, removing one or more documents of the set of documents and/or changing content of one or more documents of the set of documents. If the set of documents has changed, steps 300 to 308 may be repeated for generating a new inverted index and updating the data store with the new determined set of candidate tokens. If the set of documents has not changed, the lastly provided or generated set of candidate tokens may be maintained.

Figure 4:
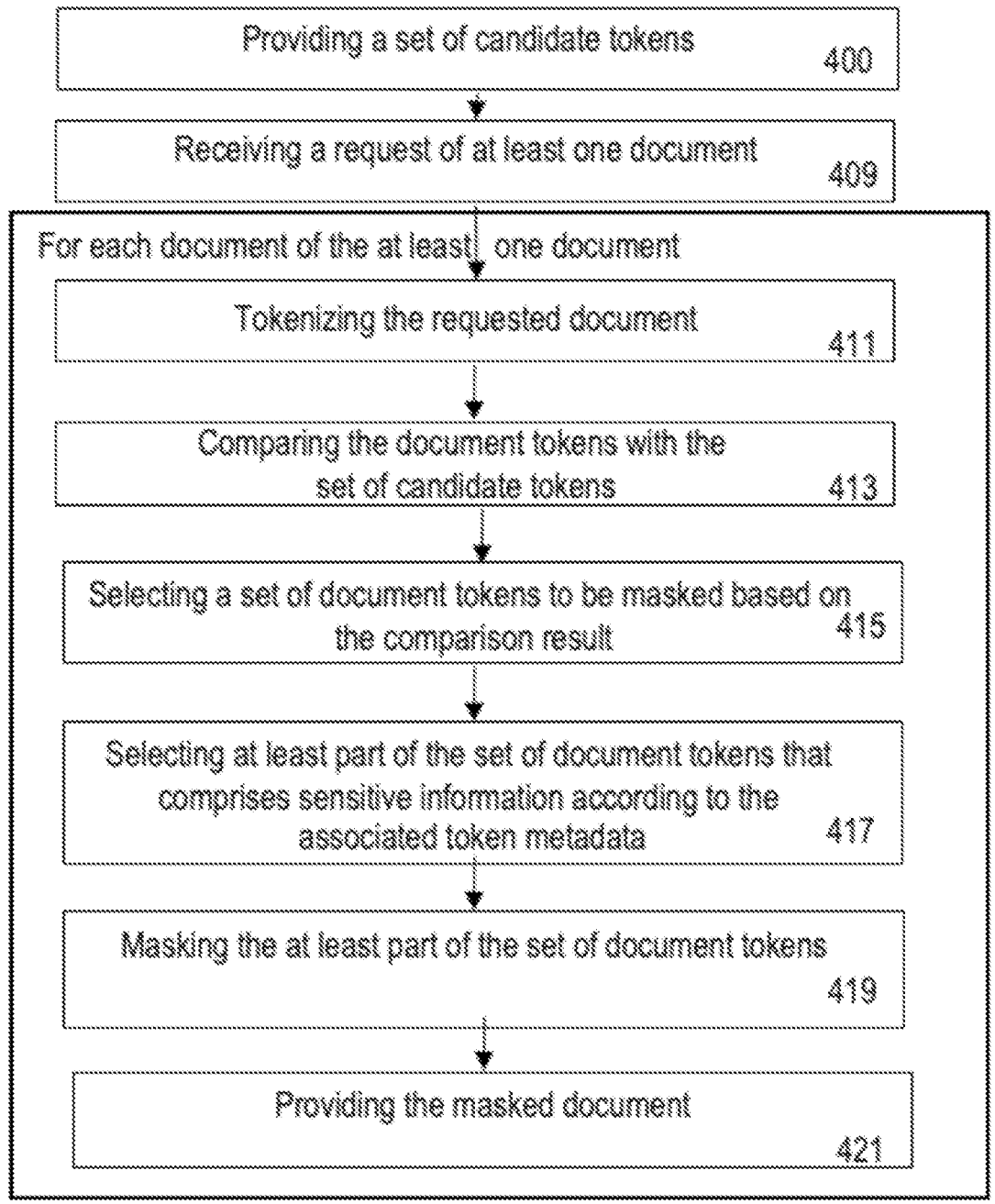
FIG. 4 depicts an exemplary flowchart illustrating a method for protecting sensitive information in documents, in accordance with the exemplary embodiments.

FIG. 4 is a flowchart of a method for protecting sensitive information in documents in accordance with an example of the present subject matter. For the purpose of explanation, the method described in FIG. 4 may be implemented in the system illustrated in FIG. 1 but is not limited to this implementation. The method of FIG. 4 may, for example, be performed by the document retrieval system 101.

In step 400, a set of candidate tokens may be provided. The set of candidate tokes are tokens which may potentially represent sensitive information. In one example, the set of candidate tokens may be provided using the method of FIG. 3 e.g. the actual content of the data store may comprise the set of candidate tokens provided in step 400. In another example, the set of candidate tokens may be defined by one or more users e.g. the one or more users may be prompted with the set of documents 108 and asked to provide the candidate tokens which may potentially comprise sensitive information and the set of candidate tokens may be received from the one or more users at the document retrieval system. Steps 409 to 421 are steps 209 to 221 of FIG. 2 respectively. Steps 409 to 421 may be performed by reading the content of the data store. Since the content of the data store is provided by an independent method e.g. of FIG. 3, the provided set of candidate tokens of step 400 may change over time.

Figure 5:
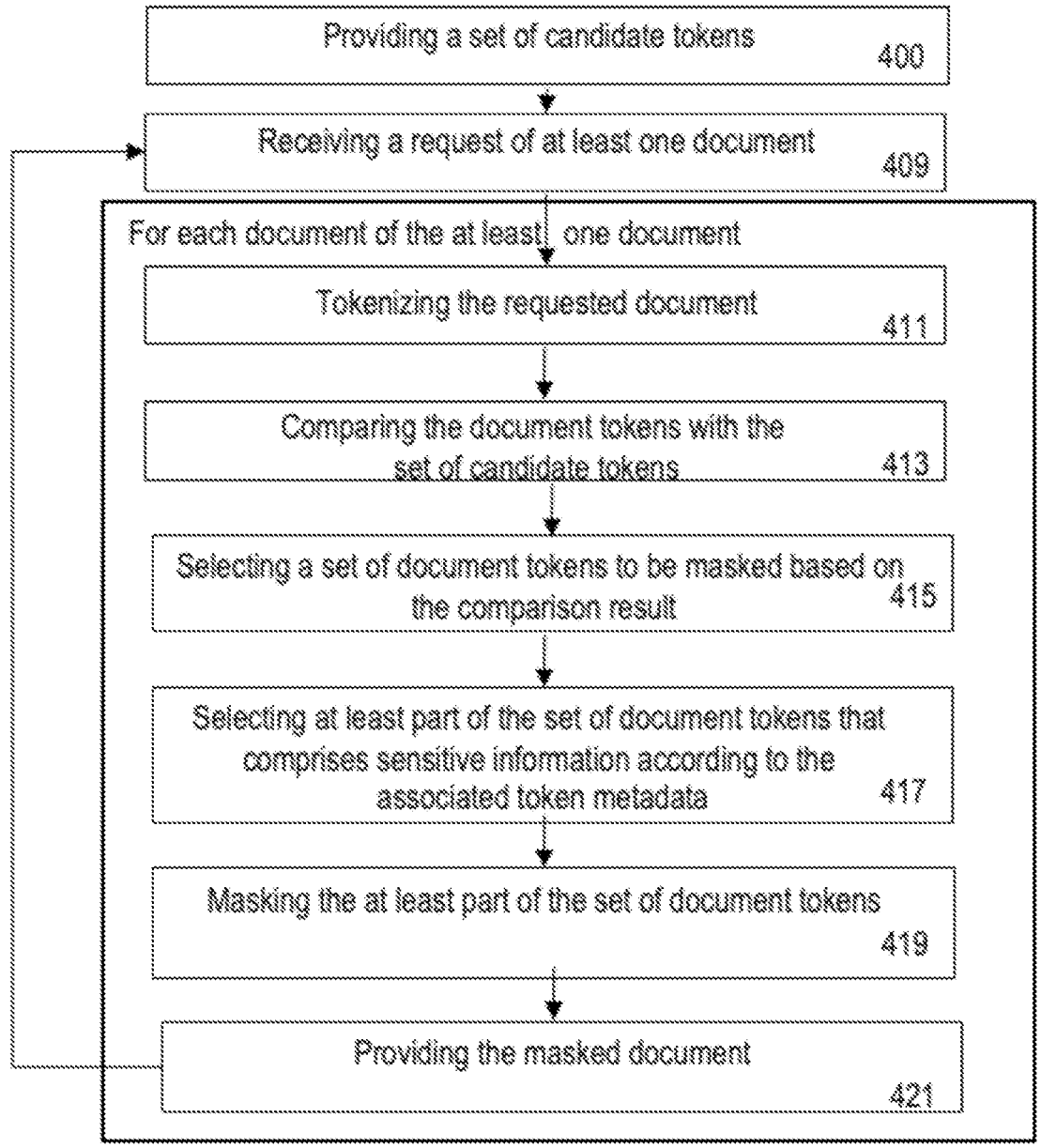
FIG. 5 depicts an exemplary flowchart illustrating a method for protecting sensitive information in documents, in accordance with the exemplary embodiments.

FIG. 5 is a flowchart of a method for protecting sensitive information in documents in accordance with an example of the present subject matter. For the purpose of explanation, the method described in FIG. 5 may be implemented in the system illustrated in FIG. 1 but is not limited to this implementation. The method of FIG. 5 may, for example, be performed by the document retrieval system 101.

The method of FIG. 5 is similar to the method of FIG. 4, wherein steps 409 to 421 are repeated for each further received request using the provided set of candidate tokens in step 400. For example, the actual data content of the data store as filled by the method of FIG. 3 may be used in each iteration.

Figure 6:
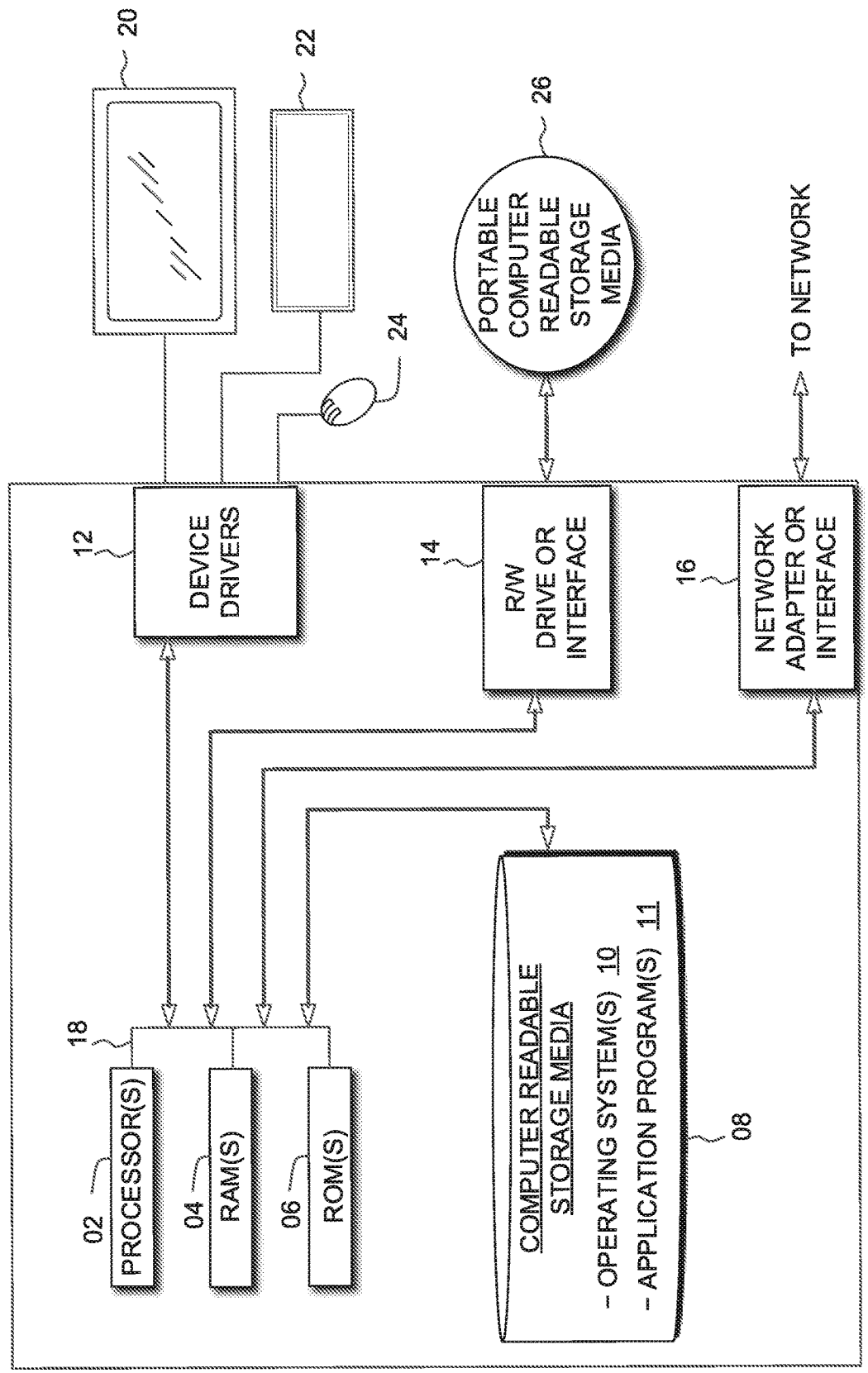
FIG. 6 depicts an exemplary block diagram depicting the hardware components of the system, in accordance with the exemplary embodiments.

FIG. 6 depicts a block diagram of devices within a system, in accordance with the exemplary embodiments. It should be appreciated that FIG. 6 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
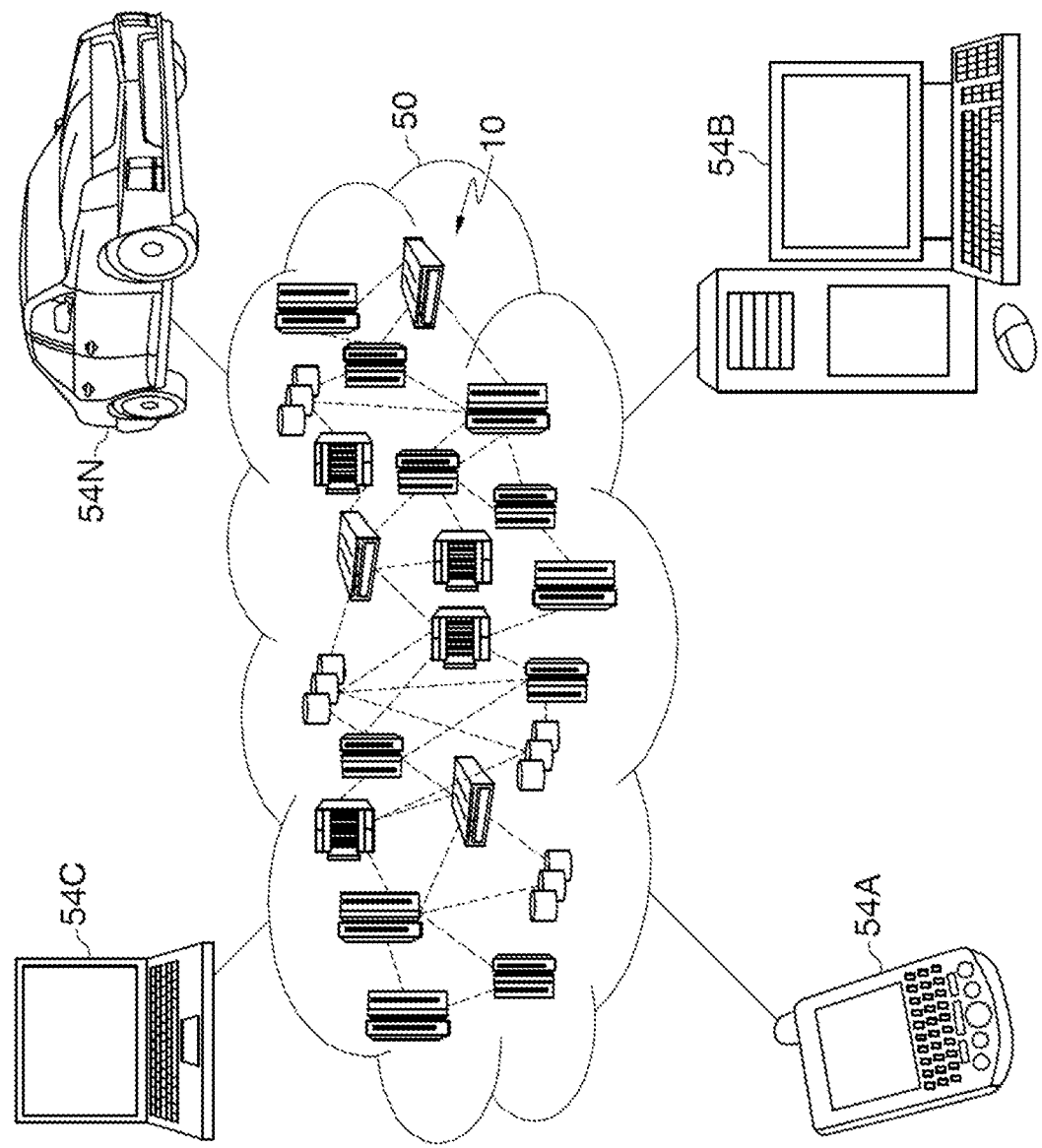
FIG. 7 depicts a cloud computing environment, in accordance with the exemplary embodiments.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
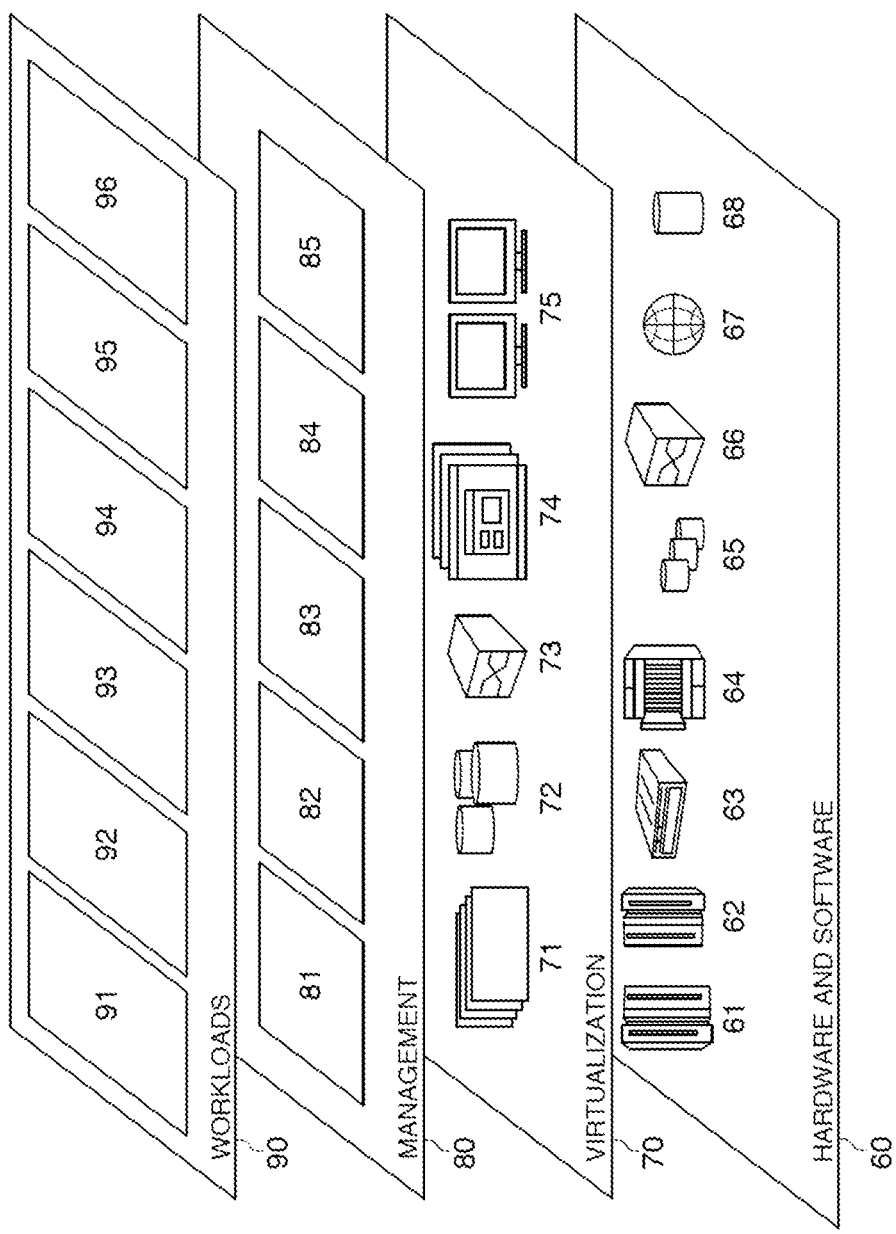
FIG. 8 depicts abstraction model layers, in accordance with the exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensitive information masking 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for protecting sensitive information in documents, the method comprising:
    providing, in a computer database, an inverted text index for a set of documents;
    evaluating via a processor one or more statistical measures of index tokens, respectively, of the inverted text index, the one or more statistical measures of the respective index token comprising at least one member selected from a group consisting of: one or more of a number of documents of the set of documents containing the index token, a frequency of occurrence of the index token in the set of documents, and a frequency of occurrence of a token type of the index token in the set of documents;
    selecting, based on the evaluation of the one or more statistical measures and via the processor, a set of candidate tokens that may contain sensitive information, the selecting the set of candidate tokens comprising comparing the one or more statical measures with a respective predefined threshold;
    extracting, via the processor, metadata from the inverted text index descriptive of the candidate tokens, respectively, wherein the extracted metadata comprises at least a token type of the index tokens, respectively, and a document identifier of a respective document containing a respective index token;
    receiving, via the processor, a request of at least one document;
    tokenizing, via the processor, the requested at least one document, resulting in document tokens;
    comparing, via the processor, the document tokens with the set of candidate tokens;
    selecting, via the processor, a set of document tokens to be masked based on the comparison;
    selecting, via the processor, at least part of the set of document tokens that comprises sensitive information according to the extracted metadata;
    masking, via the processor, the at least part of the set of document tokens in the at least one document, resulting in one or more masked documents; and
    providing, via the processor, the one or more masked documents.

2. The method of claim 1, wherein the extracted metadata further comprises topic metadata, the topic metadata comprising at least one of a topic of the set of candidate tokens and a topic of a document containing the set of candidate tokens.

3. The method of claim 2, further comprising:
    determining a token category of each token of the set of candidate tokens;
    inputting the token categories to an information governance tool; and
    receiving as output the topic metadata.

4. The method of claim 1, wherein the token type comprises one or more of a text type and a number type.

5. The method of claim 1, further comprising:
    storing the set of candidate tokens in association with the extracted metadata in a storage system;
    evaluating one or more statistical measures of updated index tokens, respectively, of an updated inverted text index;
    selecting, based on the one or more statistical measures, an updated set of candidate tokens that may contain sensitive information;
    extracting updated metadata from the updated inverted text index descriptive of the updated candidate tokens, respectively, wherein the extracted updated metadata comprises at least a token type of the updated index tokens, respectively, and a document identifier of a respective document containing an updated index token;
    storing the updated set of candidate tokens in association with the extracted updated metadata in the storage system to form an updated storage system; and selecting, from the updated storage system, updated document tokens for masking for new document retrieval requests.

6. The method of claim 1, wherein:
the selecting the at least part of the set of document tokens that comprises sensitive information according to the extracted metadata comprises running a classifier on the extracted metadata to classify the set of document tokens as sensitive or not sensitive tokens; and
the selection is performed based on the classification.

7. The method of claim 1, further comprising:
determining a respective domain represented by a content of the requested at least one document, wherein the set of documents represents the determined domain and excludes the requested at least one document.

8. The method of claim 1, wherein the set of documents comprises the requested at least one document.

9. The method of claim 1, wherein the requested at least one document is an unstructured document.

10. A computer program product for protecting sensitive information in documents, the computer program product comprising one or more non-transitory computer-readable storage media and program instructions stored on the one or more non-transitory computer-readable storage media capable of causing a computer to perform a method comprising:
providing an inverted text index for a set of documents;
evaluating one or more statistical measures of index tokens, respectively, of the inverted text index, the one or more statistical measures of the respective index token comprising at least one member selected from a group consisting of: one or more of a number of documents of the set of documents containing the index token, a frequency of occurrence of the index token in the set of documents, and a frequency of occurrence of a token type of the index token in the set of documents;
selecting, based on the evaluation of the one or more statistical measures, a set of candidate tokens that may contain sensitive information, the selecting the set of candidate tokens comprising comparing the one or more statical measures with a respective predefined threshold;
extracting metadata from the inverted text index descriptive of the candidate tokens, respectively, wherein the extracted metadata comprises at least a token type of the index tokens, respectively, and a document identifier of a respective document containing a respective index token;
receiving a request of at least one document;
tokenizing the requested at least one document, resulting in document tokens;
comparing the document tokens with the set of candidate tokens;
selecting a set of document tokens to be masked based on the comparison;
selecting at least part of the set of document tokens that comprises sensitive information according to the extracted metadata;
masking the at least part of the set of document tokens in the at least one document, resulting in one or more masked documents; and
providing the one or more masked documents.

11. The computer program product of claim 10, wherein the extracted metadata further comprises topic metadata comprising at least one of a topic of the set of candidate tokens and a topic of a document containing the set of candidate tokens.

12. The computer program product of claim 11, further comprising:
determining a token category of each token of the set of candidate tokens;
inputting the token categories to an information governance tool; and
receiving as output the topic metadata.

13. The computer program product of claim 10, wherein the token type comprises one or more of a text type and a number type.

14. A computer system for protecting sensitive information in documents, the computer system comprising one or more computer processors, one or more computer-readable storage media, and program instructions stored on the one or more of the computer-readable storage media for execution by at least one of the one or more processors to perform a method comprising:
providing an inverted text index for a set of documents;
evaluating one or more statistical measures of index tokens, respectively, of the inverted text index, the one or more statistical measures of the respective index token comprising at least one member selected from a group consisting of: one or more of a number of documents of the set of documents containing the index token, a frequency of occurrence of the index token in the set of documents, and a frequency of occurrence of a token type of the index token in the set of documents;
selecting, based on the evaluation of the one or more statistical measures, a set of candidate tokens that may contain sensitive information, the selecting the set of candidate tokens comprising comparing the one or more statical measures with a respective predefined threshold;
extracting metadata from the inverted text index descriptive of the candidate tokens, respectively, wherein the extracted metadata comprises at least a token type of the index tokens, respectively, and a document identifier of a respective document containing a respective index token;
receiving a request of at least one document;
tokenizing the at least one document, resulting in document tokens;
comparing the document tokens with the set of candidate tokens;
selecting a set of document tokens to be masked based on the comparison;
selecting at least part of the set of document tokens that comprises sensitive information according to the extracted metadata;
masking the at least part of the set of document tokens in the at least one document, resulting in one or more masked documents; and
providing the one or more masked documents.

15. The computer system of claim 14, wherein the extracted metadata further comprises topic metadata comprising at least one of a topic of the set of candidate tokens and a topic of a document containing the set of candidate tokens.

16. The computer system of claim 15, further comprising:
determining a token category of each token of the set of candidate tokens;
inputting the token categories to an information governance tool; and
receiving as output the topic metadata.

17. The computer system of claim 14, wherein the token type comprises one or more of a text type and a number type.

18. The method of claim 1, wherein the evaluating the one or more statistical measures of the index tokens, respectively, of the inverted text index and the selecting of the set of candidate tokens that may contain sensitive information comprise:
- evaluating via the processor a frequency of occurrence of an index token; and
- in response to the frequency of the occurrence being less than a frequency threshold value, evaluating via the processor a number of documents containing said index token.

19. The method of claim 1, wherein the one or more statistical measures of the respective index token comprises a frequency of occurrence of the index token in the set of documents, wherein the frequency of occurrence comprises a number of occurrences of the index token divided by a total number of documents in the set of documents.

20. The method of claim 1, wherein the one or more statistical measures of the respective index token comprises a frequency of occurrence of the index token in the set of documents, wherein the frequency of occurrence comprises a number of documents containing the index token divided by a total number of documents in the set of documents.

* * * * *